United States Patent [19]

Bishop et al.

[11] Patent Number: 4,824,024

[45] Date of Patent: Apr. 25, 1989

[54] SPRAY APPARATUS

[75] Inventors: Paul W. Bishop, Telford; Karl H. Wundschock, Harleysville, both of Pa.

[73] Assignee: Rhone-Poulenc Nederland B.V., Amstelveen, Netherlands

[21] Appl. No.: 65,059

[22] Filed: Jun. 19, 1987

[51] Int. Cl.[4] .......................... B05B 1/14; B05B 1/30; B64D 1/18

[52] U.S. Cl. ............................... 239/333.15; 239/171; 239/553.3; 239/562; 239/565; 239/571; 239/583

[58] Field of Search ..................... 239/171, 533.1, 548, 239/550, 562, 565, 567, 569, 570, 533.15, 551, 553.3, 571, 583

[56] References Cited

U.S. PATENT DOCUMENTS

| | | | |
|---|---|---|---|
| 497,937 | 5/1893 | Yandors | 239/565 X |
| 970,056 | 9/1910 | Hurley | 239/565 X |
| 2,548,340 | 4/1951 | Bower | 239/548 X |
| 2,936,958 | 5/1960 | Shames et al. | 239/562 X |
| 3,301,490 | 1/1967 | Hruby, Jr. | 239/565 X |
| 4,119,152 | 10/1978 | Koyama | 239/565 X |
| 4,231,520 | 11/1980 | Waldrum | 239/562 X |
| 4,624,414 | 11/1986 | Ferrazza | 239/467 |

FOREIGN PATENT DOCUMENTS

| | | | |
|---|---|---|---|
| 594104 | 3/1960 | Canada | 239/548 |
| 366707 | 1/1923 | Fed. Rep. of Germany | 239/565 |
| 1525608 | 4/1969 | Fed. Rep. of Germany | 239/550 |
| 2625496 | 12/1977 | Fed. Rep. of Germany | 239/567 |

*Primary Examiner*—Andres Kashnikow
*Assistant Examiner*—MaryBeth D. Jones
*Attorney, Agent, or Firm*—Morgan & Finnegan

[57] ABSTRACT

The invention is a substantially cylindrical nozzle for a spray apparatus designed to emit accurate fluid spray of uniform sized droplets. The fluid to be sprayed is urged under pressure into an inner-bore cylindrical reservoir channel, in communication with a fluid pressure responsive, positive action valve plunger. Positive displacement of the valve plunger enables the fluid to pass under the influence of fluid pressure through openings in a detachably secured connector and to exit the nozzle through substantially axially disposed, flared outlet tubes. Uniform droplet size and spray coverage is promoted by the streamlined shape of the nozzle body, flare of the outlet tubes, and dimensions (length and small internal diameter) of the outlet tubes.

10 Claims, 5 Drawing Sheets

SPRAY APPARATUS

BACKGROUND OF THE INVENTION (1) Field of the Invention

The present invention relates to the field of spray nozzles and spray apparatus to be mounted on aerial systems for spray application.

(2) Description of the Prior Art

The most important part of any spray system is the spray apparatus or nozzle that produces the spray pattern. Many deficiencies of spray system nozzles prevent liquid application from being completely effective. For example, spray nozzles often spew clouds of aerosol particles mixed with larger droplets of liquid, each falling or drifting in a trajectory determined by droplet size and weight. Such spray patterns are undesirable, for example, during treatment of agricultural crops. Formation of non-uniform droplets is an inefficient method of application and may be harmful to the environment. Furthermore, reliably efficient operation of nozzles is of utmost importance to farmers and applicators whose schedules depend upon favorable weather conditions. Nozzles currently used for spraying agricultural crops are often comprised of heavy weight materials such as metals. When mounted on a helicopter boom, these nozzles add significantly to the total helicopter weight and therefore increase the number of refuelings required.

The Microfoil® (Union Carbide) spray boom is a well-known aerial spray boom drift control system. However, this system requires a substantial amount of maintenance and lost operation time.

SUMMARY OF THE INVENTION

It is an object of the present invention to provide a spray apparatus which sprays uniform droplets. It is also an object of the present invention to provide an apparatus which effectively controls droplet drift. It is also an object of the present invention to provide an apparatus that provides long periods of trouble-free operation. Furthermore, it is an object of the present invention to provide an apparatus made of lightweight materials impervious to agricultural chemicals.

The invention is a substantially cylindrical nozzle for a spray apparatus designed to emit accurate fluid spray of uniform sized droplets. The fluid to be sprayed is urged under pressure into an inner-bore cylindrical reservoir channel, in communication with a fluid pressure responsive, positive action valve plunger. Positive displacement of the valve plunger enables the fluid to pass under the influence of fluid pressure through openings in a detachably secured connector and to exit the nozzle through substantially axially disposed, flared outlet tubes. Uniformity in the spray droplets is promoted by the streamlined shape of the nozzle body coupled with outward flare of the outlet tubes, both of which minimize air turbulence at the exit point These and other objects of the present invention will be more fully described in the detailed description.

The present invention is a spray apparatus comprising:

(a) substantially cylindrical body defining a substantially cylindrical recess and having a front end and a trailing end;

(b) an annular shoulder integral with said body and disposed at said trailing end, said annular shoulder having a system of openings substantially axially disposed on said back plate;

(c) a projection integral with said body extending from said annular shoulder having a base portion disposed concentric to and interiorly of said substantially axially disposed body openings, said annular shoulder defining a central recess disposed interiorly of said body openings and terminating at a back portion to provide an internal reservoir;

(d) tubes projecting through said body openings and extending beyond said annular shoulder and said projection;

(e) a connector detachably secured to said body, said connector having connector passageways, a fluid inlet, a fluid outlet, and a reservoir-channel;

(f) a valve means secured to the output end of said connector, the valve means extending both out of and into the reservoir channel along the central axis of said reservoir channel;

(g) a fluid pressure responsive plunger communicating with said outlet, said fluid plunger being adapted to be urged toward the trailing end of said body and into the central recess of said body under the influence of fluid pressure to permit fluid to pass through said connector-passageways, through said internal reservoir, through said body openings, and through said tubes, and being further adapted, when not under the influence of fluid pressure, to isolate the connector reservoir-channel from said internal-reservoir.

BRIEF DESCRIPTIONS OF THE DRAWINGS

DETAILED DESCRIPTION OF A PREFERRED EMBODIMENT

The present invention comprises a unique combination of flow control and precise droplet distribution in one compact, lightweight, reliable assembly. Location of a positive action valve plunger near the output tubes isolates the internal reservoir channel of liquid from said tubes, thereby providing efficient cessation of the flow of liquid. Also contributing to this desirable effect are the streamlined body and substantially axially disposed and flared outlet tubes of the apparatus.

Construction materials of the various components of the apparatus which contact the fluid to be sprayed are substantially unreactive with the fluid.

Figure 1:
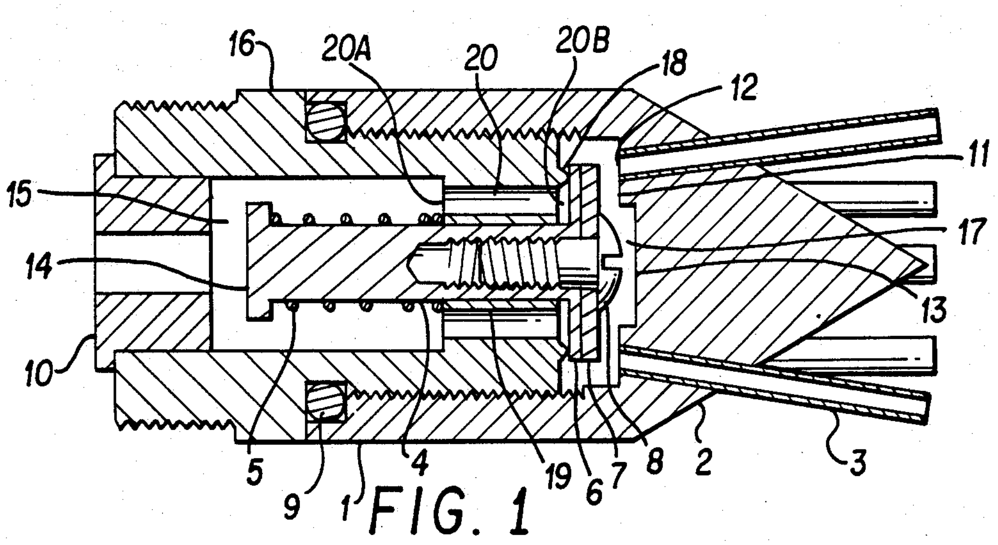
FIG. 1 is a side elevational view and cross-section of one embodiment of the apparatus when the valve means is in the closed position.
Figure 2:
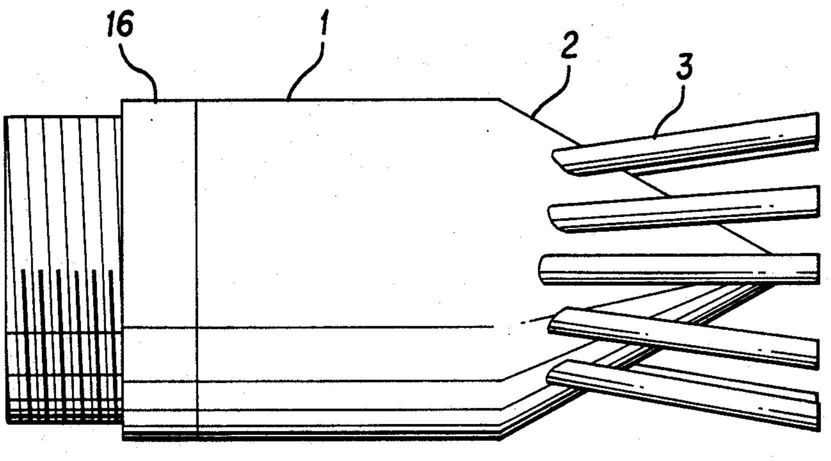
FIG. 2 is a side elevational view of one embodiment of the apparatus.
Figure 6:
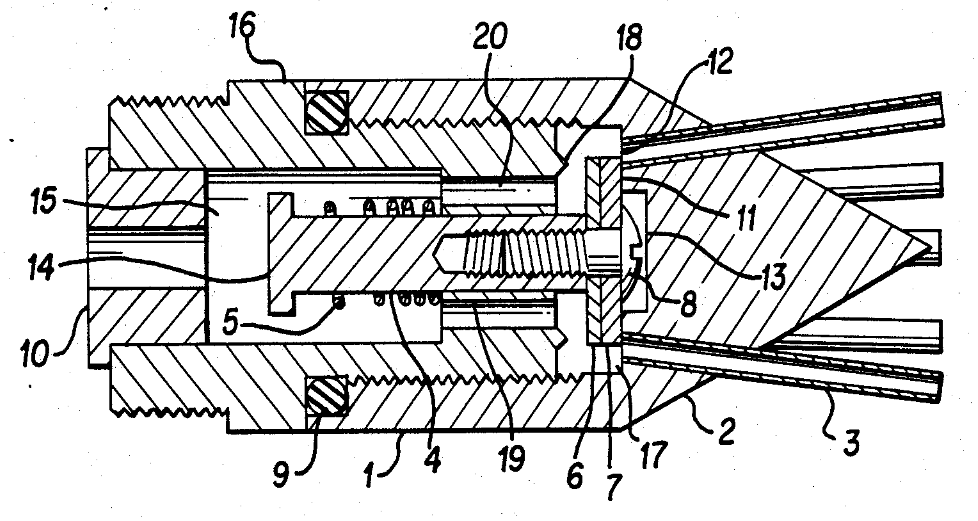
FIG. 6 is a side elevational view and cross-section of one embodiment of the apparatus when the valve means is in the open position.
Figure 8A:
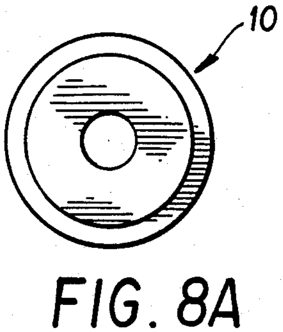
FIG. 8A is a top view of a restrictor with an internal channel.
Figure 8B:
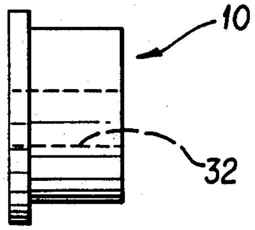
FIG. 8B is a side view of the restrictor with an internal channel.

One embodiment of the apparatus of the present invention is illustrated in FIG. 1. The apparatus is designed to accurately spray fluid in substantially uniformly sized droplets onto a target crop. Body 1, preferably made of a plastic material, is a substantially cylindrical shape defining a cylindrical recess and having a front end and trailing end. Integral with body 1 is annular shoulder 11 having a system of body openings 12 substantially axially disposed on annular shoulder 11. Also integral with body 1 is projection 2 extending from annular shoulder 11. Annular shoulder 11 defines a central recess 13 disposed interiorly of openings 12. Central recess 13 terminates at said projection to provide an internal reservoir 17. Tubes 3 project through openings 12 and extend beyond annular shoulder 11 and projection 2. Connector 16, preferably made of a plastic material, is detachably secured to body 1, has connector-passageways 20, with connector passageway inlet 20A and connector passageway outlet 20B formed by guide 19, and defines reservoir-channel 15. Fluid to be sprayed flows through reservoir channel 15. Valve means 14 is secured to outlet end of connector 16, and extends both out of and into reservoir-channel 15 along reservoir-channel 15 central axis. Fluid pressure responsive plunger 4 is a positive action valve plunger which communicates with outlet end of connector 16, and is adapted to be urged toward body 1 trailing end and central recess 13 when under influence of fluid pressure, such that when the plunger 4 is under influence of fluid pressure, fluid passes through connector-openings 20, passageways 12, and tubes 3, and also such that when not under influence of fluid pressure, plunger 4 isolates reservoir-channel 15 from internal reservoir 17. Passageway 20 has an inlet opening 20A and an outlet opening 20B. Spring 5 communicates with plunger 4 so that it presents resistance to influence of fluid pressure which urges plunger 4 toward body 1 trailing end and central recess 13. Plunger 4 extends into reservoir-channel 15 and communicates with guide 19 integral with connector 16. Plunger 4 has a threaded cavity into which the threaded portion of screw 8 is screwed and by which screw 8 is detachably secured. Spring 5 is adjacent the end of guide 19 nearest connector 16 fluid inlet. Substantially circular seal 6 is adjacent both to substantially cylindrical raised ridge 18 integral with connector 16 and substantially circular washer 7. Washer 7 is adjacent to seal 6, the screw-head of screw 8, and internal reservoir 17. The threaded portion of screw 8 projects through the hole of seal 6 and the hole of washer 7 to secure seal 6 and washer 7 between the screw-head of screw 8 and raised ridge 18. Screw-head of screw 8 is adjacent internal reservoir 17. Restrictor 10 is inserted at connector 16 fluid inlet and extend into reservoir-channel 15. Restrictor 10 is shown with internal channel 32, illustrated in cross-section in FIGS. 1 and 6. Top and side views as shown in FIGS. 8A and 8B.

Plunger 4 is preferably stainless steel to reduce friction against guide 19 of connector 16. Guide 19 is preferably made of a material such as plastic that minimizes frictional forces between plunger 4 and guide 19. Spring 5 is preferably stainless steel and acts so as to secure plunger 4. Fluid pressure forces plunger 4 toward connector 16 outlet end, and contracts spring 5.

Figure 3:
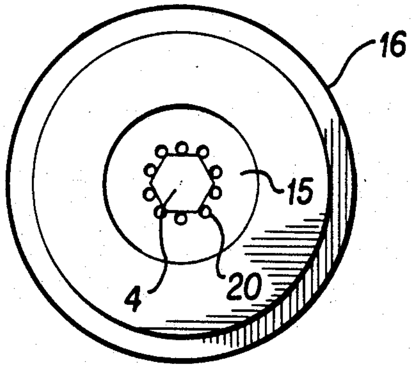
FIG. 3 is a back view of one embodiment of the connector of the apparatus.
Figure 3A:
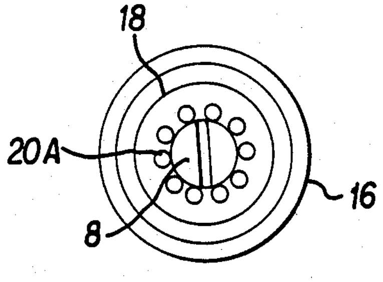
FIG. 3A is a top view of one embodiment of the connector of the apparatus.

Circular seal 6 is preferably more resilient than plastic. A rubber-type or fluorocarbon-type material such as Viton ® (DuPont) is more preferred. O-ring 9 is made of a material which is resilient enough to provide leak-free engagement between body 1 and connector 16. FIG. 3 shows a back view of connector 16. FIG. 3A shows a top view of connector 16 without washer 7, seal 6, and O-ring 9.

Figure 7B:
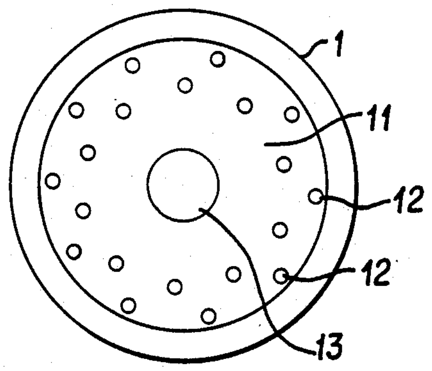
FIG. 7B is a back view of an alternative embodiment of the body of the apparatus.
Figure 7A:
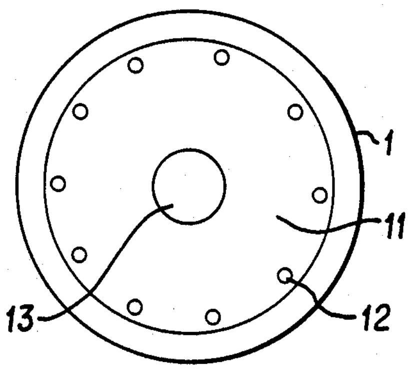
FIG. 7A is a back view of one embodiment of the body of the apparatus.

Outlet tubes 3 project from substantially axially disposed openings 12 at annular shoulder 11 and through conical projection 2. FIG. 7A depicts one embodiment having a system of substantially axially disposed openings, and FIG. 7B depicts an alternative embodiment having a system of substantially axially disposed openings. When several apparatuses of the present invention are mounted on a boom for spraying a target field from a helicopter and each apparatus is mounted about four inches to about twelve inches from an adjacent apparatus, tubes 3 are preferably flared at an angle about 5° to about 10°, and preferably about 7° to about 8° from the reservoir-channel 15 central axis. If flare angle is too small (less than about 5°), spray pattern coverage is too narrow and will result in insufficient, "striped" coverage. Striped coverage produces alternating rows of treated and untreated crops. If flare angle is too large (greater than about 10°), spray pattern coverage is too wide, and will produce interfering spray patterns resulting in non-uniformly sized droplets. Interfering spray patterns cause inefficient, uneven coverage. Flare angles greater than about 10° and less than about 5° would be appropriate only if other parameters such as boom length and separation distance between each apparatus were adjusted.

Outlet tubes 3 are preferably at a length which minimizes turbulence, and a sufficient diameter so the flowing fluid forms into droplets. The desired length and diameter are such that formation of satellite droplets or fine droplets, i.e., formation of those droplets substantially smaller than the majority of droplets formed from the tube, is minimized. An essential feature is that the tubes have deburred edges so as to minimize formation of satellite droplets.

Tubes 3 are preferably stainless steel hypodermic material. Tubes 3 may also be plastic, or plastic having a stainless steel flow channel.

Inside diameter of tubes 3 is an important factor in determining droplet size and spray coverage. A high number of tubes having small openings increases uniformity of coverage. Such coverage is important in forestry work such as site preparation of an area to be retimbered. A low number of tubes having large openings diminishes uniformity of coverage, but is desirable when formation of large droplets is required, i.e., during adverse wind conditions. Such coverage is effective for application of systemic materials which merely require contact between the systemic and a portion of the target plant.

Figure 4A:
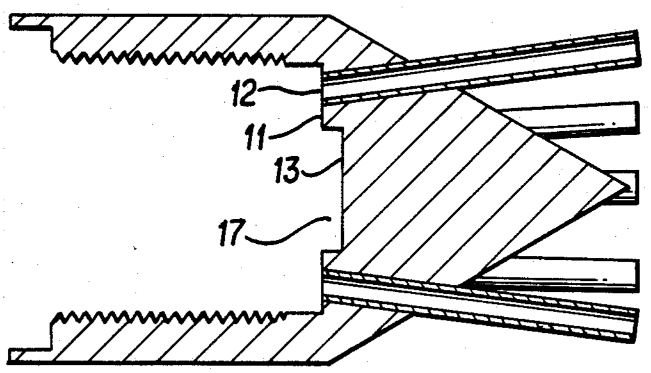
FIG. 4A is a side elevational view and cross-section of one embodiment of the body of the apparatus.
Figure 4B:
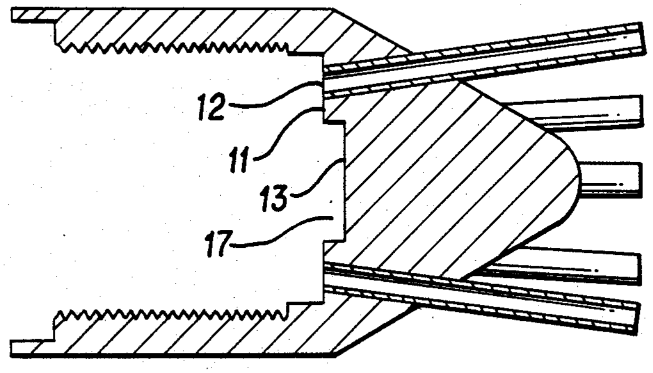
FIG. 4B is a side elevational view and cross-section of one embodiment of the body of the apparatus.
Figure 5:
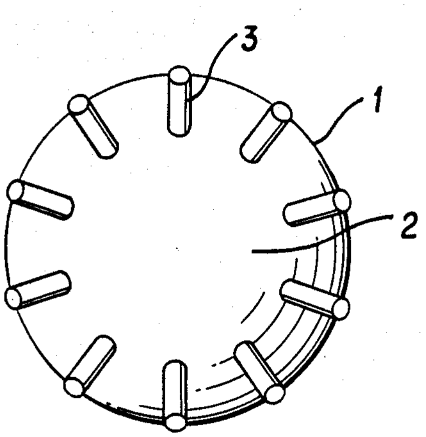
FIG. 5 is a front view of one embodiment of the body of the apparatus.

Projection 2 must be shaped to reduce air turbulence, i.e. burbling, that would otherwise disturb droplet uniformity. The shape is preferably one that ensures instantaneous purging of droplets clinging to tubes when fluid flow ceases. A preferred projection shape is a substantially conical shape that reduces turbulence resulting from interaction of the air stream flowing along exteriors of connector 16 and body 1. FIGS. 4A and 4B show preferred substantially conical projection shapes. Most preferred is a conical shape as depicted in FIG. 4A.

The assembly is preferably constructed so that it can be conveniently separated into two sub-assemblies should replacement of either sub-assembly be necessary.

The assembly preferably has the output tubes located near the boom in order to benefit from the low pressure turbulence-free area behind the boom's trailing edge. Uniform droplets released into the low pressure turbulence-free area remain intact. Tube size is preferably that size which provides stable droplets of sufficient number to give efficient spray control at practical rates.

EXAMPLES

Example 1

44 spray apparatuses of the present invention were mounted on a 22 foot boom used to spray fluid from a helicopter. The fluid was first applied at a rate of about 15 gallons per acre under pressure of 15 psi and subsequently applied at a rate of 25 gallons per acre under pressure of 36 psi. A 36 foot swath width was generated.

This spray system provided efficient, uniform droplet size and uniform coverage of the target field without stray coverage onto adjacent, non-target fields.

Example 2

Apparatuses of the present invention were easily installed on a standard 26 foot Microfoil® boom mounted on a turbo charged Hiller 12-E helicopter. A modified boom end cap was also installed, which provided additional swath width. During initial testing, two loads of water were sprayed. These tests demonstrated excellent valve function, fluid flow shut-off capability, and minimal dripping after fluid flow shut-off. An actual 54 foot swath width was measured.

Subsequent flights were made for application of active chemicals on pine plantings. The first two 100 gallon loads contained purple dye as an aid in evaluating droplet uniformity and distribution. Droplet uniformity and droplet distribution were found to be excellent. Additionally, pattern shift due to a 4 mph crosswind was minimal and no drift was observed.

All applications were made with a 0.045 inch nozzle cap in place and at 35–40 mph flight speed. System pressure of 30 psi resulted in an application rate of about 20 gallons per acre. Various other application rates were also achieved.

Use of the apparatus of the present invention provides superior placement accuracy of fluids and low weight for fuel efficient flight. The apparatus is also easy to maintain and can be manufactured via injection molding.

What is claimed is:

1. A spray apparatus comprising:

(a) a substantially cylindrical body defining a substantially cylindrical recess and having a front end and a trailing end;

(b) an annular shoulder integral with said body and disposed at said trailing end, said annular shoulder having a system of openings substantially axially disposed on said annular shoulder;

(c) a projection integral with said body extending from said annular shoulder having a base portion disposed concentric to and interiorly of said axially disposed body openings, said annular shoulder defining a central recess disposed interiorly of said body openings and terminating at a back portion to provide an internal reservoir;

(d) tubes projecting through said substantially axial body openings and extending beyond said annular shoulder and said projection;

(e) a connector detachably secured to said body, said connector having parallel axially disposed connector-passageways, a fluid inlet, a fluid outlet, and a reservoir channel;

(f) a valve means secured to the output end of said connector, said valve means extending both out of and into the reservoir-channel along the central axis of said reservoir-channel;

(g) a fluid pressure responsive plunger communicating with said fluid outlet, said fluid plunger being adapted to be urged toward the trailing end of said body and into the central recess of said body under the influence of fluid pressure to permit fluid to pass through said connector-passageways, through said internal reservoir, through said body openings and through said tubes, and being further adapted, when not under the influence of fluid pressure, to isolate the connector reservoir-channel from said internal reservoir.

2. A spray apparatus as defined in claim 1, wherein a spring is located within the connector, surrounding said plunger, a substantially circular seal having a hole, a substantially circular washer having a hole, and a screw having a screw-head and a threaded portion, said plunger extending into the channel and communicating with a guide integral with said connector, said plunger further having a threaded cavity by which the threaded portion of said screw is detachably secured, said spring being adjacent to the guide end nearest the connector fluid inlet, a substantially cylindrical raised ridge integral with the connector, said seal being adjacent to the raised ridge, screw-head and internal reservoir, said threaded portion of the screw projection through the hole of the seal and the hole of the washer to secure said seal and said washer between the screw-head and connector raised ridge, and said screw-head being adjacent to the internal reservoir, the seal being attached to the washer, and the washer attached to the plunger.

3. A spray apparatus as defined in claim 1, wherein a restrictor is inserted at the fluid inlet and extends into the channel.

4. A spray apparatus as defined in claim 1, wherein the projection is conical.

5. The spray apparatus of claim 1 wherein the tubes projecting through said substantially axial openings are flared outward at an angle with the reservoir-channel axis as they extend beyond said annular shoulder and said projection.

6. The spray apparatus of claim 5 wherein the flare angle of the tubes is greater than 5° but less than 10° outward from the reservoir-channel central axis.

7. The spray apparatus of claim 6 wherein the flare angle is 7°–8° outward from the reservoir-channel central axis.

8. The spray apparatus of claim 5 wherein the tubes projecting outward are straight throughout their length.

9. A substantially cylindrical fluid dispersing body defining a cylindrical recess and having a front end and a trailing end, said body having an annular shoulder integral with said body disposed at said trailing end, said annular shoulder having a system of body openings substantially axially disposed on said annular shoulder; a projection integral with said body extending from said annular shoulder, said projection having a base portion concentric to and interiorly of said substantially axially disposed body openings, said annular shoulder defining a central recess disposed interiorly of said body openings; substantially axially disposed tubes projecting from said substantially axially disposed openings, through said projection, and extending out of said projection, said tubes extending at an angle away from the horizontal central axis of said body.

10. A body as defined in claim 9, wherein the projection is conical.

* * * * *